Aug. 7, 1934.  T. DELEHANTY  1,968,931
AUTOMOBILE HEADLIGHT
Filed May 15, 1930
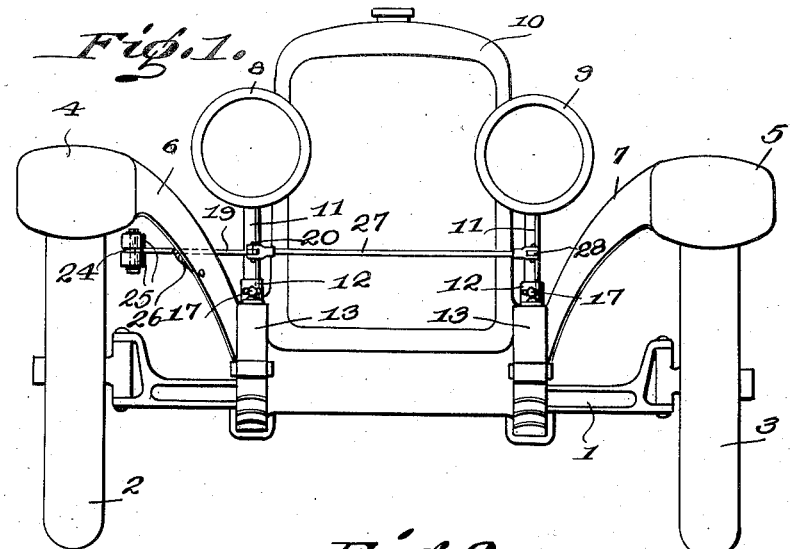
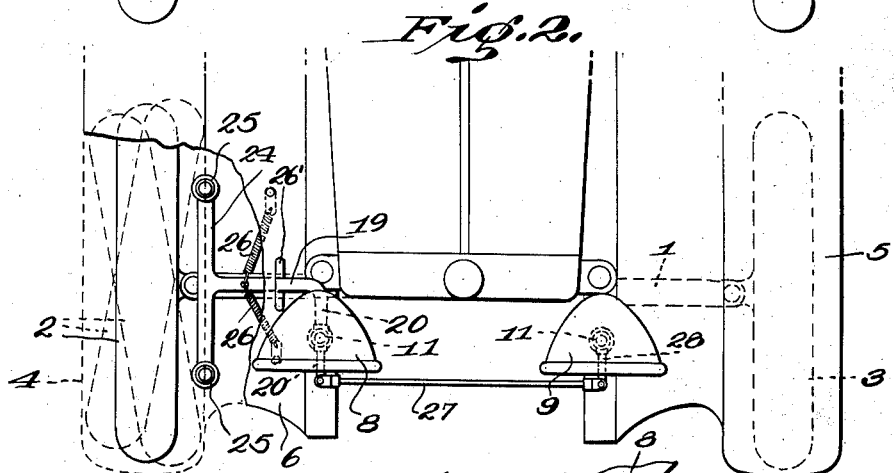
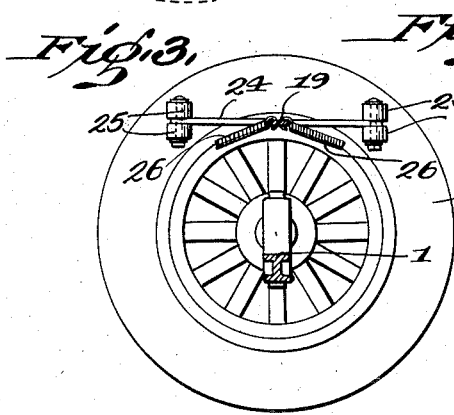
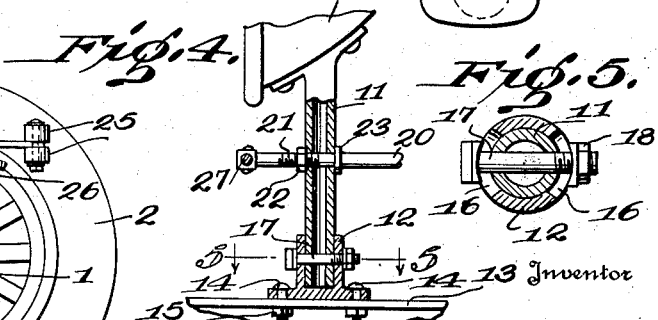
Inventor
Thomas Delehanty
By Milans & Milans
Attorneys Patented Aug. 7, 1934

1,968,931

UNITED STATES PATENT OFFICE 1,968,931

AUTOMOBILE HEADLIGHT

Thomas Delehanty, Washington, D. C.

Application May 15, 1930, Serial No. 452,744

3 Claims. (Cl. 240—62)

My invention relates to new and useful improvements in headlights and more particularly to automobile headlights of the dirigible type in which the lights are adapted to be directed at all times in the path of movement of the machine such as when making a turn or going around a curve, the lights being mounted in suitable manner for swinging or oscillating movement and operated through mechanism adapted to be engaged by one of the front wheels.

The principal object of the present invention resides in the provision of novel means adapted to be connected to automobiles of various makes or constructions and connected to the headlights of any well-known form to properly operate the same to at all times direct the light rays in the path of movement of the vehicle, said operating means being positioned relative to one of the front wheels of the automobile so as to be engaged thereby when turning the vehicle in either direction, the positioning being such that the operating means will not be engaged in normal steering in a substantially straight direction or due to vibrations upon going over irregularities in the road bed.

Another object of the invention consists in providing the operating member adapted to be engaged by the wheel with anti-friction rollers or the like to prevent undue wear of the tires.

A further object resides in providing means for normally holding the operating means in such a manner as to position the headlights to direct the light rays straight ahead of the vehicle in normally running or when not making a turn or going around a curve.

With the above and other objects in view which will appear as the description proceeds, my invention consists in the novel details of construction and arrangement of parts described in the following specification and illustrated in the accompanying drawing, and while I have illustrated and described the preferred embodiments of the invention, as they now appear to me, it will be understood that such changes may be made as will fall within the scope of the appended claims.

In the drawing:—

Fig. 1 is a front view of an automobile with my attachment applied.

Fig. 2 is a fragmental top plan with parts broken away.

Fig. 3 is a detail showing the inner face of one of the front wheels with the operating member in position relative thereto.

Fig. 4 is a fragmental detail, partly in vertical section, showing the manner of mounting the headlights; and Fig. 5 is a horizontal section on the line 5—5 of Fig. 4.

In the drawing 1 indicates the front axle, 2 and 3 the front wheels, 4 and 5 the front mud guards or fenders including the aprons 6 and 7, and 8 and 9 the headlights positioned in front of the radiator 10, the parts being such as are found on automobiles of well-known constructions. The wheels 2 and 3 will be operated in the usual manner for steering.

The headlights 8 and 9 each include a supporting standard 11 and I have shown the lower ends of the standards as being received in sockets 12 secured to the automobile frame 13 by means of the bolts 14 and nuts 15. Each of the socket members 12 is provided with the opposed elongated circumferentially extending openings 16 in which operates a bolt 17 which also extends through the standard 11 as shown more particularly in Figs. 4 and 5 of the drawing, each of the bolts receiving a nut 18 for holding the same in place. It will thus be seen that the standards are mounted in the sockets for swinging or rotatable movement, such movement being limited by engagement of the bolt with the ends of the openings 16. The bolts prevent vertical movement of the standards relative to the sockets.

Secured to the standard 11, of the headlight 8, is a bell crank lever including the arms 19 and 20, the arm 20 passing through the standard 11, as shown more particularly in Fig. 4 of the drawing, and provided with the threaded portion 21 to receive the nut 22. A collar 23 is formed on the arm and engages the standard on that side opposite to that engaged by the nut 22. Formed on or secured to the outer end of the arm 19 is a bar 24 which extends parallel with the inner face of the wheel 2 but spaced a distance therefrom as quite clearly shown in Figs. 1 and 2 of the drawing for a purpose which will be later described. A pair of rollers 25 are carried by the bar 24, at each end thereof, and these rollers are adapted to engage the inner side of the tire forming a part of the wheel 2 when the wheel is steered to make a turn or in going around a curve. The bar, with the rollers, is spaced a sufficient distance from the inner face of the wheel or tire forming a part thereof that the rollers will not be engaged when the vehicle is being driven in a substantially straight line or when the wheels are vibrated through unevenness in the road bed or the like. Coiled springs 26 are secured to the arm 19 of the bell crank lever and to the under surface of the apron 6 of the mud guard or fender 4, these springs extending on opposite sides of the arm as shown more particularly in Fig. 2 of the drawing, and normally holding the lever in a position to in turn hold the headlight 8 with its light rays directed straight ahead of the vehicle. As shown more particularly in Fig. 2 of the drawing the arm 19 passes through an elongated opening 26' formed in the apron 6, the opening being of such a length as to allow the necessary movement of the arm 19 therein.

A rod or bar 27 has one end connected to that portion of the arm 20 of the bell crank lever which extends through the standard 11 and the opposite end of the rod is secured to an arm 28 secured to the standard 11 of the headlight 9. By means of the rod 27 the headlights 8 and 9 are connected for operation in unison and when the headlight 8 is turned, in either direction, the headlight 9 will be similarly turned through means of the connection therebetween.

From the above detail description it is thought that the construction and operation of my invention will be clearly understood. While I have shown the headlights as being mounted with the lower ends of their standards received in the sockets 12 I wish it understood that my invention is not to be limited to this particular construction and that I have only illustrated this construction to show one means for mounting the headlights for swinging movement. My invention resides in the means for swinging or rotating the headlights to direct the light rays in front of the machine when making a turn or when going around a curve. Normally the parts will be in the positions shown in Figs. 1 and 2 of the drawing with the bar 24 extending parallel with the inner face of the wheel 2 and with the rollers 25 positioned a distance from the face of the wheel. With this positioning of the parts a sufficient play is allowed for the wheel 2 in ordinary driving or steering without engagement with the rollers 25. The bar is held in this normal position by means of the coiled springs 26. When a left hand turn is to be made the wheel 2 will be so turned that the tires forming a part thereof will engage the rollers 25 on the forward end of the bar 24 and through means of the bell crank lever the headlight 8 will be swung to project the light rays towards the left or to maintain the rays in front of the vehicle while turning. As the headlight 9 is connected to the headlight 8 through means of the connecting rod 27 it will be similarly turned. If the vehicle is to be turned to the right the wheel 2 will be so swung as to engage the rollers 25 on the rear end of the bar 24 and this engagement of the rollers will operate the bell crank lever to swing the headlights 8 and 9 towards the right. It will be seen that I have provided novel means which may be connected to any well-known form of headlight constructions and in which the operation of the headlights takes place by contact by the wheel itself with the rollers carried by a member normally extending parallel with the inner face of the wheel. After the lights have been swung in either direction and the wheel is moved from engagement with either pair of rollers 25 the parts will be returned to their normal position by means of the coiled springs 26.

Having fully described my invention what I claim as new and desire to secure by Letters Patent is:—

1. In an automobile including a headlight mounted for swinging movement and a mudguard extending over the wheel with an apron provided with an opening, a horizontal member extending through the apron opening with an arm connected to the headlight and a portion extending parallel with the face of the steering wheel, the ends of the portion extending parallel with the face of the steering wheel being normally spaced from the face of the wheel but in a position to be engaged by the wheel when the same is swung in either direction in a steering movement.

2. In an automobile including a headlight mounted for swinging movement and a mudguard extending over the wheel with an apron provided with an opening, a horizontal member extending through the apron opening with an arm connected to the headlight and a portion extending parallel with the face of the steering wheel, the ends of the portion extending parallel with the face of the steering wheel being normally spaced from the face of the wheel but in a position to be engaged by the wheel when the same is swung in either direction in a steering movement, and means connected to the horizontal member and to the apron and concealed beneath the apron for normally holding the headlight to project its light rays straight ahead and to return the headlight to its normal position as the steering wheel is straightened.

3. In a vehicle including a headlight mounted for swinging movement, of means controlled by the movement of a steering wheel of the vehicle for operating the headlight, said means including a member having a portion connected directly to and carried by the headlight and a portion extending parallel with the face of a steering wheel, the ends of the parallel extending portion being normally spaced from the face of the wheel but in position to be engaged thereby when the wheel is swung in either direction in a steering movement.

THOMAS DELEHANTY.